(12) United States Patent
Swayne et al.

(10) Patent No.: US 6,485,055 B1
(45) Date of Patent: Nov. 26, 2002

(54) ANCHORAGE SYSTEM AND APPARATUS FOR A CHILD SAFETY SEAT AND METHOD OF USING SAME

(75) Inventors: Andrew K. Swayne, Dublin, OH (US); Aron K. Madsen, Marysville, OH (US); Jeffrey P. Tiefenthaler, Mechanicburg, OH (US); Kazuhiko Maruyama, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/633,203

(22) Filed: Aug. 7, 2000

(51) Int. Cl.$^7$ .............................................. B60R 22/00
(52) U.S. Cl. ................. 280/801.1; 297/253; 297/250.1; 296/65.03
(58) Field of Search ........................... 280/801.1, 801.2; 297/250.1, 253; 296/65.03; 24/633, 265 AL

(56) References Cited

U.S. PATENT DOCUMENTS

| | | | | |
|---|---|---|---|---|
| 2,609,761 A | * | 9/1952 | Clark | 105/369 |
| 2,804,313 A | * | 8/1957 | Gilles | 280/150 |
| 2,833,343 A | * | 5/1958 | Benson | 155/189 |
| 3,028,200 A | * | 4/1962 | Dye | 297/389 |
| 3,512,830 A | * | 5/1970 | Norman et al. | 297/250 |
| 3,954,280 A | * | 5/1976 | Roberts et al. | 280/744 |
| 4,072,113 A | | 2/1978 | Thurston | |
| 4,099,770 A | * | 7/1978 | Elsholz et al. | 297/216 |
| 4,219,229 A | | 8/1980 | Ciocan | |
| 4,396,228 A | * | 8/1983 | Go | 297/484 |
| 4,842,458 A | | 6/1989 | Carpenter | |
| D311,326 S | * | 10/1990 | Nelson | D8/356 |
| 4,978,157 A | | 12/1990 | Murakami | |
| D314,133 S | * | 1/1991 | Issard | D8/367 |
| 4,991,271 A | | 2/1991 | Bauer | |
| 5,180,263 A | * | 1/1993 | Flowers, Jr. | 410/106 |
| 5,248,176 A | * | 9/1993 | Fredriksson | 294/1.1 |
| 5,695,243 A | * | 12/1997 | Anthony et al. | 297/250.1 |
| 5,774,948 A | * | 7/1998 | Petschke et al. | 24/265 CD |
| D407,298 S | * | 3/1999 | Hemphill | D8/367 |
| 5,941,601 A | * | 8/1999 | Scott et al. | 297/253 |
| 6,213,696 B1 | * | 4/2001 | Austin | 410/106 |
| 6,224,129 B1 | * | 5/2001 | Cisternino et al. | 296/65.3 |
| 6,230,372 B1 | * | 5/2001 | Sokurenko et al. | 24/264 CD |
| 6,234,572 B1 | * | 5/2001 | Shiino et al. | 297/253 |

OTHER PUBLICATIONS

"Top Anchorage General Summary" "Child Seat Q&A's", "Top Anchorage Requirement for Vehicles", and "Uniform Child Restraint Anchorages" on–line information pages available from National Highway Traffic Safety Administration at www.nhtsa.dot.gov, printed on Apr. 3, 2000.

* cited by examiner

Primary Examiner—Paul N. Dickson
Assistant Examiner—Deanna Draper
(74) Attorney, Agent, or Firm—Carrier, Blackman & Associates, P.C.; Joseph P. Carrier; William D. Blackman

(57) ABSTRACT

A safety restraint anchoring device for use in a vehicle includes an anchor plate having an opening defined therethrough, the plate being adapted to have multiple portions thereof fixed to a support panel in a vehicle body, and a rigid rod member connected to the anchor plate. The rod member has a loop shaped portion extending through the opening and projecting away from said plate, and the loop shaped portion is adapted to securely receive a child restraint seat attachment tether. The rod member also has ends welded to a surface of the anchor plate and the loop shaped portion of the rod member extends through the opening in the plate. The anchor plate is adapted to be welded or otherwise fixed to a lower surface of the support panel and the loop shaped portion of the rod member extends through an opening defined in the support panel and projects away from the support panel when the anchor plate is fixed to the support panel.

20 Claims, 4 Drawing Sheets

ANCHORAGE SYSTEM AND APPARATUS FOR A CHILD SAFETY SEAT AND METHOD OF USING SAME

BACKGROUND OF THE INVENTION

1. Field of the Invention

The present invention relates to child restraint anchorage systems. More particularly, the present invention relates to the following: a weld-on child restraint anchor, which preferably uses a vehicle's parcel shelf box structure for attachment, an installation kit for installing a child restraint anchor system into a vehicle as part of the vehicle's parcel shelf box, and to methods of using same.

2. Background Art

In accordance with Federal Motor Vehicle Safety Standards (FMVSS) 213 and 225, manufacturers of child restraints have begun producing a new generation of child safety seats, which attach to vehicles in a new way. These new safety seats include a top tether strap designed to improve seat stability and to reduce the potential for head injury. Beginning Sep. 1, 1999, vehicle manufacturers have equipped most new passenger cars (excluding convertibles), minivans, light trucks, and SUV's with corresponding top tether strap anchorage attachments. With a new generation child seat, a consumer installs the seat in the rear seat of a vehicle using the seat belt to secure the bottom of the seat, and the child seat tether and tether hook to secure the top of the seat to the vehicle's child anchor.

With reference to FIGS. 1 and 2, conventionally many vehicle manufacturers use a bolton style child anchor 2 that is secured with a bolt 4 to a child anchor weld nut 6, which nut is typically welded to a flange on a vehicle's front stiffener panel 8 or a separate smaller bracket (not shown). The anchor 2 has an opening 14 to which a tether hook 24 of a child safety seat may be connected. This style of child anchor is relatively straight forward, but it has some disadvantages and inefficiencies associated with its use. For example, one disadvantage with the conventional arrangement of FIGS. 1, 2, is the time-consuming and awkward installation process. Installation of such arrangement occurs at the vehicle factory, and specifically it takes two workers approximately 45 seconds to install it at 3 seat locations, and installation requires the use of an anti-rotation jig to guarantee that the anchor is straight and facing forward. In a vehicle assembly line context, relative to its size and complexity, this is a time-consuming and awkward process.

The conventional design is also obtrusive in appearance, and can hinder easy tether hook attachment. To improve the appearance, a hinged tray cap 12 is often used to cover the bolt-on anchor when not in use. However, when in use the hinged cap is in an open position that exposes an undesirable portion of the body colored steel around the anchor, which is not otherwise covered by any cover panel, such as the panel 20. It is sometimes also difficult with this conventional design to install the tether hook 24 of a child safety seat (not shown), because the projecting head of the bolt 4 is disposed relatively close to the tether securing opening 14 in the projecting portion of the anchor.

Other known disclosures of mounting structures for seats exist, such as is disclosed in U.S. Pat. No. 4,978,157, but such mounting structures do not provide the anchoring necessary for restraint systems. Additionally, other various anchorage devices are known in the art for anchoring cargo and other materials, such as are disclosed in the following U.S. Pat. Nos.: 4,991,271; 4,842,458; 4,219,229; 4,072,113. These anchorage systems are far more complex and difficult to install than the present invention, are generally obtrusive, and are not designed to meet the strict government testing requirements required of anchors for safety restraints.

While numerous anchorage systems of various types exist, and in light of the new Federal Safety Standards, a need still exists for an improved anchorage system for a child safety seat having enhanced structural strength and reliability, but which is also economical to manufacture and install, convenient to use, and which also has an improved aesthetic appearance.

SUMMARY OF THE INVENTION

The present invention has been developed to overcome the foregoing limitations and disadvantages of known anchorage systems for child safety seats.

According to the invention there is provided a safety restraint anchoring device for use in a vehicle having a support panel, the assembly comprising:

an anchor plate having an opening defined therethrough, the plate being adapted to have multiple portions thereof fixed to the support panel; and a rigid rod member connected to the anchor plate, the rod member having a loop shaped portion extending through the opening and projecting away from the plate, and the loop shaped portion being adapted to securely receive a child restraint attachment tether.

Such safety restraint anchoring device according to the invention is very advantageous in comparison to conventional anchoring devices for several reasons. One important advantage is that the anchoring device of the invention greatly reduces or even eliminates the undesirable moment that occurs at the point of attachment of the anchor plate in the conventional device as shown in FIGS. 1–2. Particularly, the connection of the rod member to the anchor plate and the connection of multiple portions of the anchor plate to the support panel permits the loop shaped portion to yield enough relative to the support panel that the ultimate force vector applied to the support panel when the tether pulls on the loop shaped portion is more parallel to the panel surface. Correspondingly, the anchoring device has greater reliability and durability than conventional designs.

Further, such anchoring device is much less expensive to manufacture and install because it has fewer components than the conventional designs, noting that the anchoring device includes only the anchor plate and bent rod which are connected to the vehicle, and because it can be easily installed outside of an assembly line environment.

Preferably, the anchor plate is welded to a lower surface of the support panel, while the loop shaped portion of the rod member extends through an opening defined in the support panel and projects away from the support panel when the anchor plate is fixed to the support panel such that said anchor plate is concealed from view within a passenger compartment of the vehicle beneath the support panel. This is desirable because the anchoring device does not detract from the appearance of the vehicle interior, i.e., the only nominally visible portion thereof is the projecting loop shaped portion of the rod member, and because there is no component of the anchoring device (such as the bolt head in the conventional device of FIGS. 1, 2) to interfere with connecting a tether to the loop shaped portion.

Also, it is preferred that the support panel includes a main panel and a stiffener connected thereto, and the anchor plate has one end thereof welded to the main panel and an opposite end thereof welded between portions of the main panel and the stiffener. These features are very advantageous because the anchoring device is very securely, yet easily connected to the support panel through the welds, essentially forming a strong front box section by the connected main panel, stiffener and anchor plate.

According to the present invention there is also provided a method for forming a child restraint anchor structure in a vehicle, comprising the following steps: forming a child restraint anchor assembly, including an anchor plate having an opening defined therein and a rod member fixedly attached to the underside of the anchor plate with a loop shaped portion extending through the hole; and fixing the anchor assembly to a support panel of a vehicle body having an opening formed therein such that the loop shaped portion of the rod member also extends through the opening in the support panel. The fixing step involves securing one end of the anchor plate to a portion of the support panel, and then securing an opposite end of the anchor plate to another portion of the support panel.

Again, such method according to the invention is relatively simple and economical to perform in comparison to conventional practices, and yet results in it a very strong and reliable anchor device as discussed above; it is preferred that the support panel includes a main panel and a stiffener connected thereto, while the anchor plate has one end thereof welded to the main panel and an opposite end thereof welded between portions of the main panel and the stiffener.

It is an object of the present invention to provide a safety restraint anchoring system for a vehicle which has a relatively simple construction, as well as excellent strength and reliability.

Another object of the present invention is to provide such a system which is also easy and convenient to install.

It is a further object of the invention to provide such a system which is inconspicuous and easy to use.

Other objects, advantages and salient features of the invention will become apparent from the following detailed description, which should be read in accordance with the accompanying drawings. Throughout the following description, like numbers refer to like parts.

DETAILED DESCRIPTION OF THE INVENTION

Figure 3:
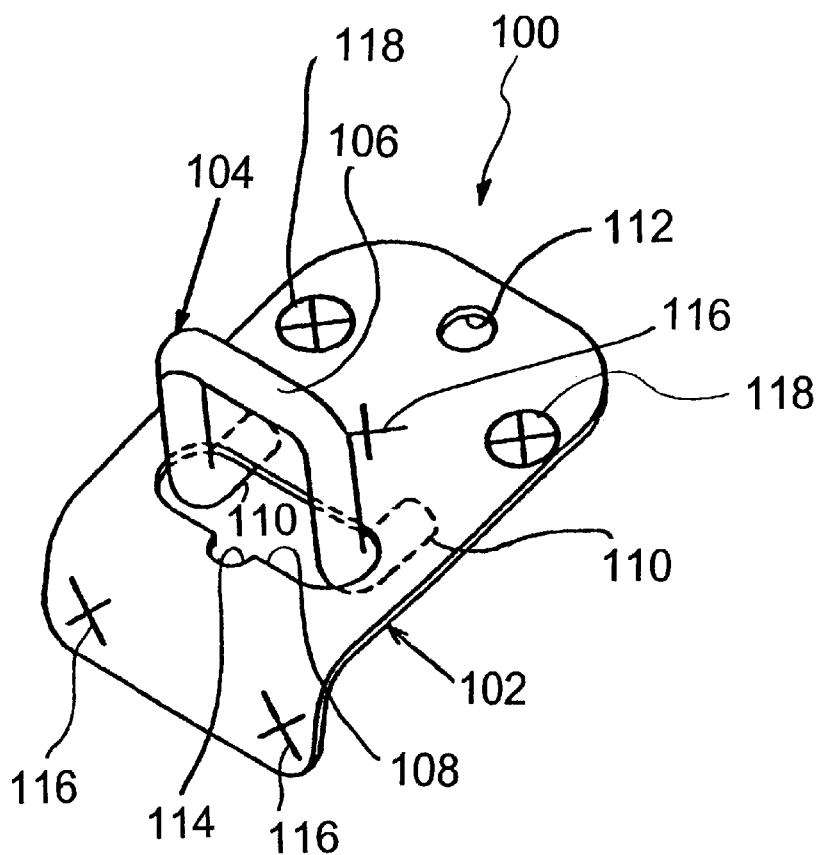
FIG. 3 is a perspective view of a child safety seat anchoring device according to the present invention.
Figure 4:
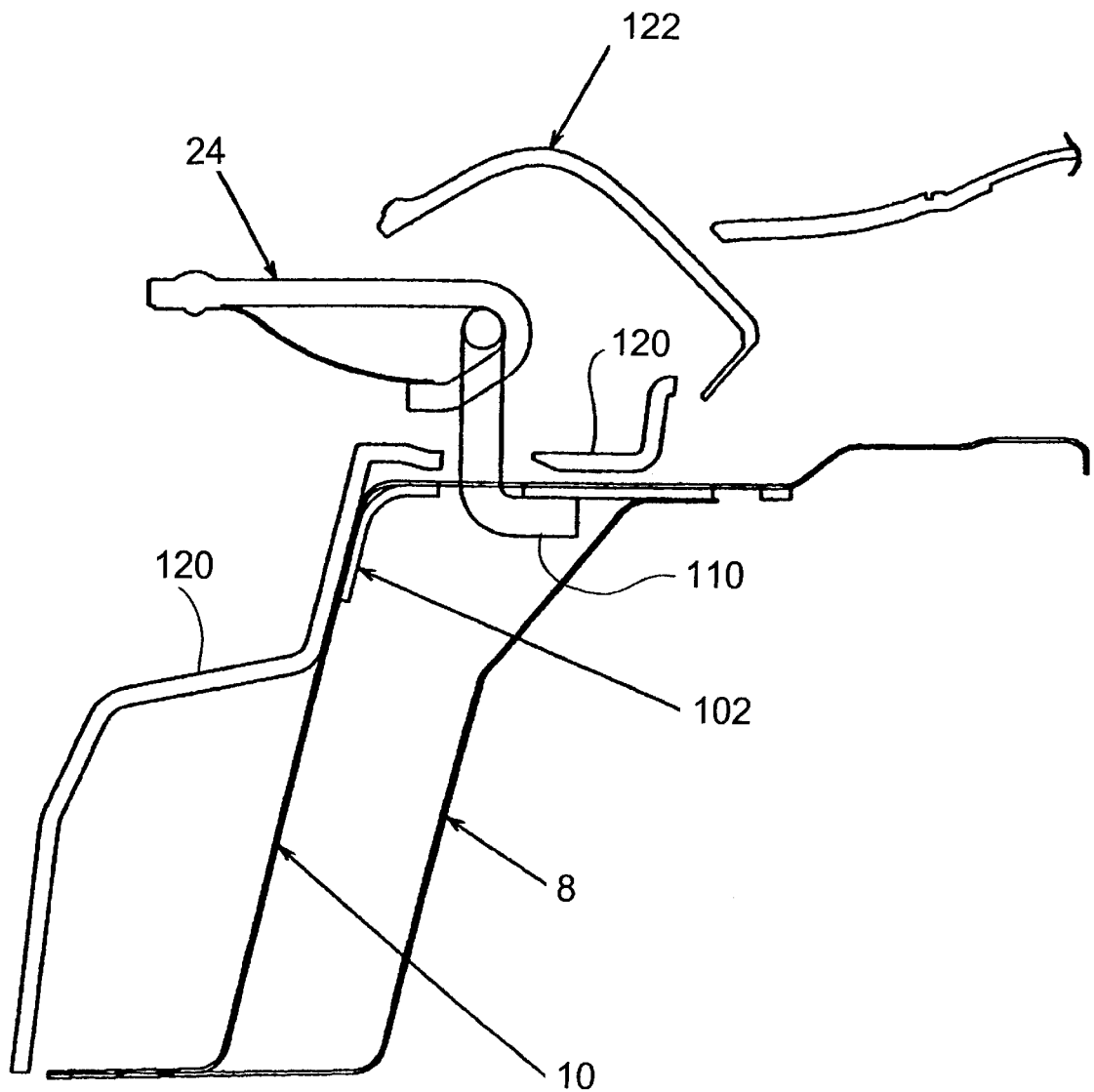
FIG. 4 is a sectional side view of the anchoring device of FIG. 1, as installed on a vehicle.

Referring now to FIGS. 3 and 4, there is shown an embodiment of a child safety seat anchoring device 100 according to the present invention. The anchoring device 100 has a very simple structure, including only an anchor plate 102 and a rigid rod member 104 connected to the plate. In use, the anchoring device 100 is connected to a panel 10 of a vehicle body such that a top tether hook 24 of a child safety seat (not shown) may be secured to a loop shaped portion 106 of the rigid rod member 104.

The rigid rod member 104 is preferably made from a metal, such as steel, and is bent in the form of a hook, including the central loop shaped portion 106 and ends 110 which extend in a direction substantially perpendicular to the loop shaped portion 106, as shown. The rod 104 may, for example, be formed of steel and have a diameter of 4–10 mm.

The anchor plate 102 is preferably made from a rigid metal plate, such as a steel plate, and has a central opening 108 defined therethrough. The anchor plate may, for example, be formed of steel and have a thickness of 1–2 mm. The rod member 104 is preferably connected to the anchor plate 102 by having the ends 110 welded to one face thereof, e.g., mig welded to a lower face of the plate, such that the loop shaped portion 106 extends through the central opening 108 in the plate and projects away from the opposite face of the plate.

Of course, other materials besides steel may be used for constructing the anchor plate 102 and rod member 104. For example, other metals such as aluminum could be used, or even plastics if they have sufficient strength and durability.

The plate 102 also has a smaller opening 112 formed therethrough near one end of the plate, and a small recess 114 formed as an extension of the central opening 108. The opening 112 and recess 114 are used to quickly and accurately align the plate 102 relative to the vehicle body panel 10 when the plate is being connected to the panel as discussed further below.

In general, the plate 102 is shaped such that the one face thereof (e.g., the upper face) fully flushly engages a surface (e.g., a lower surface) of the panel 10. In the embodiment as shown in FIGS. 3–4, a major portion of the anchor plate 102 is substantially planar, with a front end portion bent downwardly substantially perpendicular to the major portion, thereby corresponding to the shape of the lower surface of the panel 10.

Method of Connecting the Anchoring Device to the Vehicle Body Panel

As discussed above and depicted in FIGS. 3–4, the anchoring device 100 is preferably connected to the panel 10 such that the loop shaped portion is disposed where the upper tether hook 24 of a child restraint seat may be easily secured thereto. Particularly, the device 100 is depicted as connected to lower surface of a panel 10 known as a parcel shelf behind the rear seat in an automotive vehicle, as well as to an upper surface of a front stiffener 8 for the parcel shelf, such that the loop shaped portion 106 of the rod extends vertically above the panel 10 through an opening defined in the panel and aligned with the opening 108 in the anchor plate 102. The opening 108 in the anchor plate preferably has a size and shape substantially the same as a size and shape of the opening in the support panel. A plurality of the anchoring devices would be provided in any given vehicle, each corresponding to a different seat position where a child safety seat may be connected.

Preferably, the plate 102 is connected to the panel 10 and stiffener 8 in the following manner. First, the plate is welded to the panel using multiple (here three) two-sheet spot welds 116, and then the front stiffener 8 is welded to lower surfaces of the panel 10 and the anchor plate using multiple (here two) three-sheet spot welds 118, such that a rear portion of the plate 102 is sandwiched between the panel 10 and the stiffener 8. This construction of the three parts forms a very strong box section across the entire front of the panel as shown.

Optionally, the alignment opening 112 and recess 114 formed in the anchor plate 102 may be used for quickly and accurately aligning the plate with the panel 10 prior to the welding steps. Particularly, the loop shaped portion 106 of the rod 104 would be inserted through the opening in the panel 10, the opening 112 and/or the recess 114 in the plate 102 would be engaged with corresponding projection(s) on the lower surface of the panel 10, and when so engaged, the large opening 108 in the plate 102 would be accurately aligned with the opening in the panel, at which time the first welding step would be conducted. The opening 108 in the anchor plate preferably has a size and shape substantially the same as a size and shape of the opening in the support panel.

Advantages of the Invention

Figure 1:
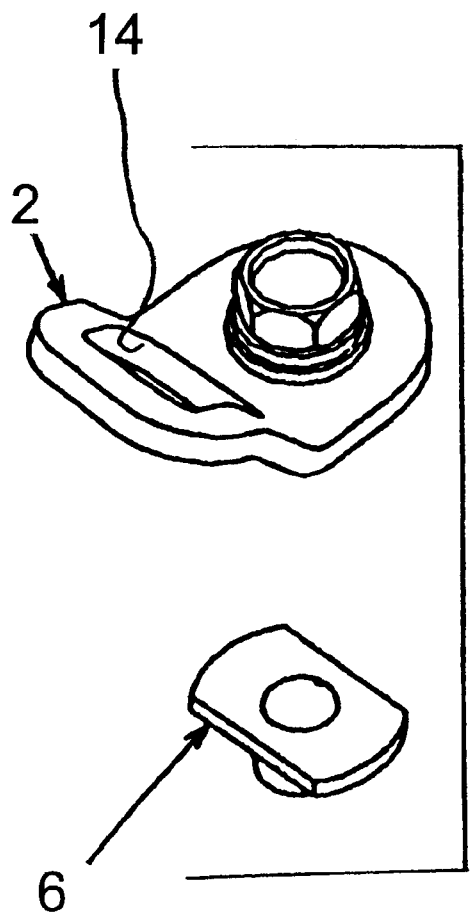
FIG. 1 is a perspective view of a conventional child safety seat anchoring device for a vehicle, including an anchor, a bolt and a securing nut.
Figure 2:
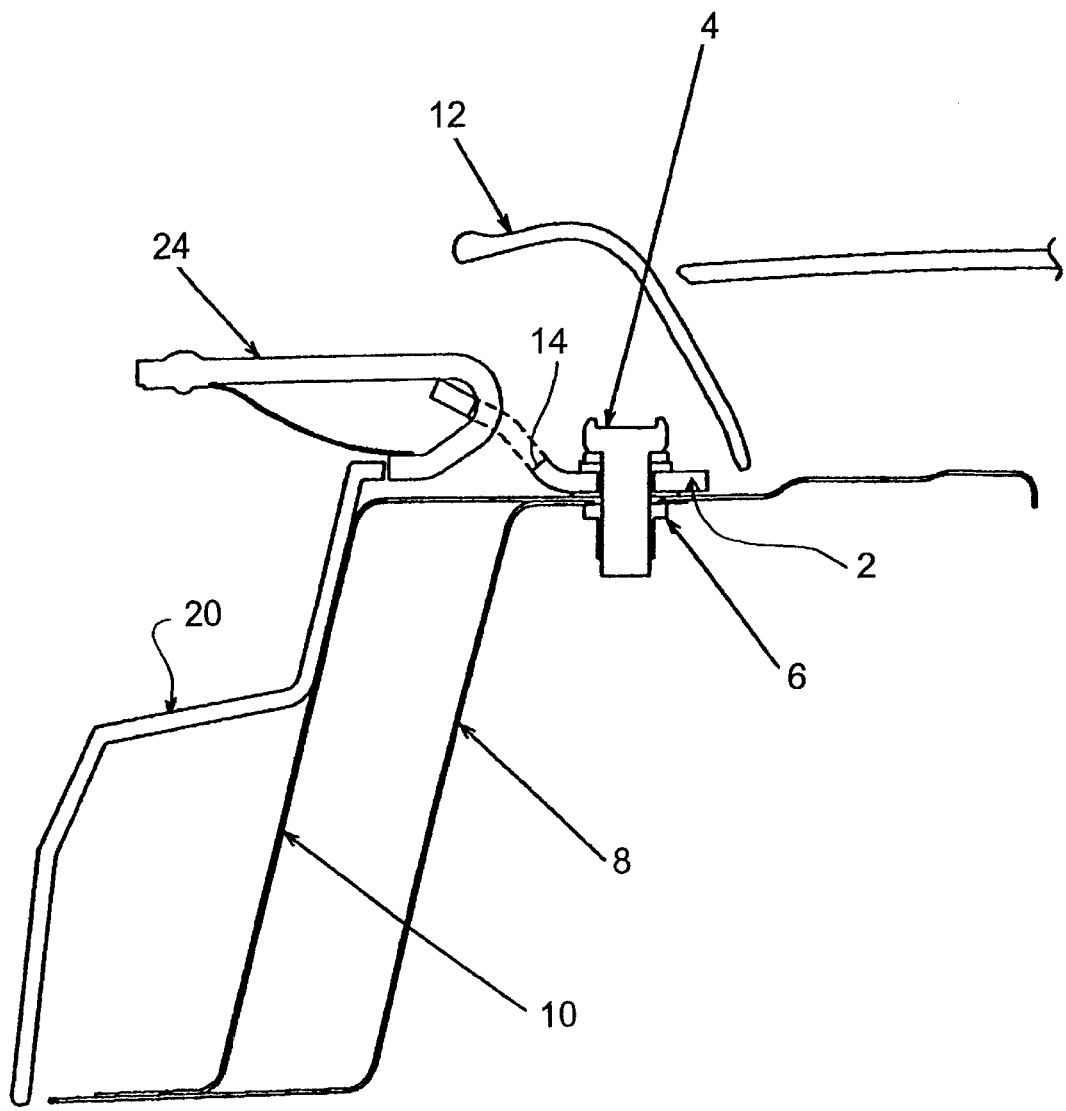
FIG. 2 is a sectional side view of the conventional anchoring device of FIG. 1, as installed on a vehicle.

Although the above construction of the connected anchor plate and rod member is rather simple, as are the welded connections between the rod 104, the plate 102, the panel 10 and the stiffener 8, such anchoring device and apparatus according to the invention nonetheless provides great strength and reliability in comparison to conventional structures, including that shown in FIGS. 1–2. One aspect of this advantage is the fact that the plate 102 is connected to the panel 10 (and stiffener) in multiple locations via the spot welds 116, 118, and the plate is also connected to the rod 104 with multiple welds at the two ends of the rod. This is in contrast to the conventional bolt-on arrangement of FIGS. 1–2. Also, because of the multiple welds and the fact that the welds 116, 118 are provided on portions or ends of the plate on opposite sides the central opening 108, the loop shaped portion is permitted to yield enough relative to the panel 10 that the ultimate force vector applied to the support panel when the tether hook 24 pulls on the loop shaped portion 106 (when the vehicle is in an accident, for example) is more parallel to the panel surface. Still further, the bent structure of the plate 102, corresponding to the bent shape of the panel 10 to which the plate is welded, provides additional strength to the overall anchoring apparatus, including the device 100 and the panel 10 and stiffener 8 to which it is connected.

Further, given the disposition of the anchoring device 100 beneath the panel 10, it is very inconspicuous and does not appreciably detract from the appearance of the vehicle interior to which is connected. The only portion of the device 100 which is visible within the passenger compartment of the vehicle is the loop shaped portion 106 which projects slightly above the panel 10, but even this portion is shielded from view by a covering panel 120 which surrounds the portion 106, and a hinged tray cap 122 which covers the portion 106 when not in use.

Still further, such anchoring device and apparatus according to the invention is much less expensive to manufacture and install than conventional devices because it has far fewer components than the conventional designs, noting that the anchoring device does not require any additional component for distributing forces or increasing strength, and because it can be easily installed on a vehicle outside of an assembly line environment.

Also, because there is no component of the anchoring device (such as the bolt head in the conventional device of FIGS. 1, 2) to interfere with connecting/disconnecting a tether hook of a child safety seat to the loop shaped portion 106, it is easier to use the anchoring device than it is to use the conventional device.

Although the present invention has been described herein with respect to depicted embodiment thereof, the foregoing description is intended to be illustrative, and not restrictive. Many modifications may be made to the described embodiment without departing from the scope hereof.

For example, the anchor plate could be connected to the upper face of the support panel of the vehicle body, even though this would give it a less favorable appearance, and in which case it would not be necessary to provide an opening in the panel. Similarly, the ends of the rod could be connected to the upper surface of the anchor plate, rather than the lower surface, and the plate could have recesses or openings defined therein to receive the rod ends. The anchor plate could be formed without the central opening and the ends of the rod could instead be connected to lateral sides of the anchor plate. The anchor plate could be formed to integrally include a loop shaped portion, rather than connecting the rod to the plate, and the plate could be fastened to the panel using screws or rivets or other fastening means besides welds. The welds could be formed in elongate patterns, rather than as spot welds, and spot welds could be provided on the sides of the central opening of the plate, as well the locations depicted. Further, the loop shaped portion of the rod need not extend perpendicularly to the ends thereof, and could have other shapes than that depicted, etc.

All such modifications, which fall within the scope of the appended claims, are intended to be within the scope and spirit of the present invention.

We claim:

1. A child safety restraint anchoring device for use in a vehicle having a, support panel, the device comprising:
   an anchor plate having an opening defined therethrough, said plate being adapted to have multiple portions thereof fixed to the support panel; and
   a rigid rod member having ends welded to a surface of said anchor plate, said rod member having a loop shaped portion extending through said opening and projecting away from said plate, said loop shaped portion being adapted to securely receive a child restraint seat attachment tether.

2. A child restraint anchoring device as recited in claim 1, wherein said loop shaped portion extends through the opening in the anchor plate.

3. A child restraint anchoring device as recited in claim 1, wherein said anchor plate is adapted to be fixed to a lower surface of the support panel and said loop shaped portion of said rod member is adapted to extend through an opening defined in the support panel and project away from the support panel when the anchor plate is fixed to the support panel.

4. A child restraint anchoring device as recited in claim 3, wherein said anchor plate is concealed from view within a passenger compartment of the vehicle when the anchor plate is fixed to the lower surface of the support panel.

5. A child restraint anchoring device as recited in claim 4, wherein said opening in said anchor plate has a size and shape substantially the same as a size and shape of the opening in the support panel.

6. A child restraint anchoring device as recited in claim 3, wherein said anchor plate is adapted to have said multiple portions thereof welded to the lower surface of the support panel.

7. A child restraint anchoring device as recited in claim 1, wherein said anchor plate is adapted to have said multiple portions thereof welded to a surface of the support panel.

8. A child restraint anchoring device as recited in claim 1, wherein one face of said anchor plate is adapted to fully, flushly engage a surface of the support panel.

9. A child restraint anchoring device as recited in claim 1, wherein an upper face of said anchor plate is adapted to fully, flushly engage a lower surface of the support panel.

10. A child restraint anchoring device as recited in claim 9, wherein one end of said anchor plate is bent in a direction substantially perpendicular to an opposite end of said anchor plate.

11. A child restraint anchoring device as recited in claim 1, wherein the support panel includes a main panel and a stiffener connected thereto, and said anchor plate is adapted to have one said portion thereof connected to said main panel and another said portion thereof connected between portions of the main panel and the stiffener.

12. A child restraint anchoring device as recited in claim 1, wherein said anchor plate includes means for accurately positioning said plate relative to the support panel.

13. A child restraint anchoring device as recited in claim 1, wherein said anchor plate and said rod member are formed of steel.

14. A child restraint anchor assembly for a vehicle, comprising:

a support panel of a body of the vehicle;

an anchor plate having multiple portions thereof fixed to the support panel; and a rigid rod member having ends welded to a central portion of said anchor plate, said rod member having a loop shaped portion projecting away from said plate in a direction substantially perpendicular to said anchor plate, said loop shaped portion being adapted to securely receive a child restraint seat attachment tether;

the support panel including a main panel and a stiffener connected thereto, and said anchor plate has one portion thereof connected to said main panel and another portion thereof connected between portions of the main panel and the stiffener.

15. A child restraint anchor assembly for a vehicle, comprising:

a support panel of a body of the vehicle;

an anchor plate having multiple portions thereof fixed to the support panel; and a rigid rod member having ends welded to a central portion of said anchor plate, said rod member having a loop shaped portion projecting away from said plate in a direction substantially perpendicular to said anchor plate, said loop shaped portion being adapted to securely receive a child restraint seat attachment tether;

said support panel has an opening defined therethrough;

said anchor plate has an opening defined therethrough and is fixed to a lower surface of said support panel such that the opening of said anchor plate is aligned with the opening of said support panel, and said loop shaped portion of said rigid rod member extends through said openings in said anchor plate and in said support panel, and projects away from the upper surface of said support panel.

16. A child restraint anchor assembly as recited in claim 14, wherein said anchor plate has opposite ends thereof welded to the lower surface of the support panel.

17. A child restraint anchor assembly for a vehicle, comprising:

a support panel of a body of the vehicle;

an anchor plate having multiple portions thereof fixed to the support panel; and a rigid rod member having ends welded to a central portion of said anchor plate, said rod member having a loop shaped portion projecting away from said plate in a direction substantially perpendicular to said anchor plate, said loop shaped portion being adapted to securely receive a child restraint seat attachment tether;

said anchor plate has opposite ends thereof welded to the lower surface of the support panel; and said rod member ends are welded to a lower surface of said anchor plate, and said loop shaped portion extends in a direction substantially perpendicular to said ends.

18. A method for forming a child restraint anchor structure in a vehicle, comprising the following steps:

forming a child restraint anchor assembly, including an anchor plate having an opening defined therein and a rod member fixedly attached to the underside of said anchor plate with a loop shaped portion extending through said opening; and fixing said anchor assembly to a support panel of a vehicle body having an opening formed therein such that said loop shaped portion of the rod member also extends through said opening in the support panel;

said fixing step involves securing one end of the anchor plate to a portion of the support panel, and then securing an opposite end of the anchor plate to another portion of the support panel.

19. A method as recited in claim 18, wherein the support panel includes a main panel and a stiffener connected thereto, and said opposite end of the anchor plate is connected between portions of said main panel and said stiffener.

20. A child safety restraint anchoring device for use in a vehicle having a support panel, the device comprising:

an anchor plate having an opening defined therethrough, said plate being adapted to have multiple portions thereof fixed to the support panel; and a rigid rod member immovably attached to said anchor plate, said rod member having a loop shaped portion extending through said opening and projecting away from said plate, and said loop shaped portion being adapted to securely receive a child restraint seat attachment tether.

* * * * *